Patented Apr. 29, 1930

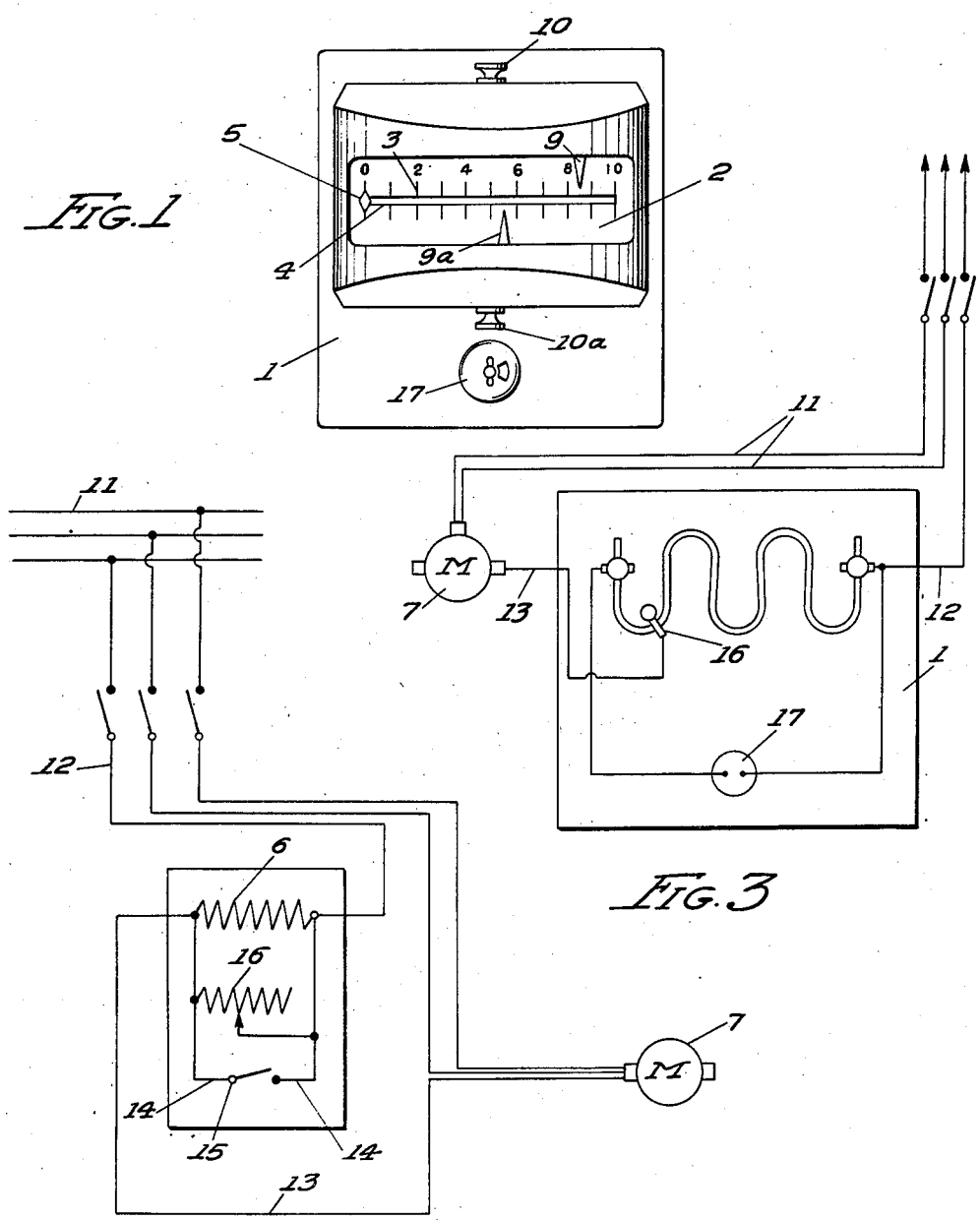

1,756,286

UNITED STATES PATENT OFFICE

ARTHUR W. FARRALL AND GROVER D. TURNBOW, OF DAVIS, CALIFORNIA

APPARATUS FOR DETERMINING VARIATIONS IN THE PHYSICAL CONDITIONS OF AGITATED MATERIALS

Application filed May 6, 1926. Serial No. 107,303.

This invention relates to improvements in electrical apparatus for determining variations in the consistency of a product which is being agitated and particularly to one in which the variation in the consistency causes a variation of the pull of the motor driving the machine and thereby causes the indicating or recording device, to register changes according to the consistency of the product, as encountered particularly in connection with the commercial manufacture of ice cream.

In the freezing of ice cream in a power driven freezer, the agitator or any part of which is driven by a motor, it is customary to freeze the mix until it becomes somewhat stiff and then turn off the freezing medium and whip the mix until it has incorporated enough air or other gas to give the desired yield. It is very desirable in order to get uniform ice cream of the best quality that these two critical points be accurately determined for each batch and the objects of the improvement are, First, to provide an ammeter or wattmeter type recording instrument which will show variations in the consistency of an agitated ice cream mix through a change in the load on the motor which drives the agitator; second, to provide pointers which accurately indicate to the operator the critical points during the processing; third, to provide a means of simple adjustment which enables the same apparatus to be used on different sized machines having different current and motor specifications; fourth, to provide a by-passing switch which can be used to by-pass a part of the heavy starting load and thus protect the apparatus.

The principal object of our invention is to enable the critical points of the processing to be accurately determined by means of a simple apparatus inserted in the circuit to the motor and operated by the current or combination of current and voltage thereto.

By means of this apparatus the critical points can be readily determined by merely noting the positions of the needle of the instrument relative to the adjustable pointers. This is possible because the power consumption and amperage drawn by the motor which drives the freezer increases as the freezing takes place and the material stiffens. Then when the freezing medium is turned off and the mixture incorporates air this decreases the stiffness of the material and hence the amperage drawn by the motor decreases. This causes a corresponding change in the position of the needle of the instrument attached in the circuit. A further object of the invention is to produce a simple and inexpensive means and yet one which will be exceedingly effective for the purpose for which it is designed.

One form of the invention is illustrated in the accompanying drawing in which Fig. 1 is a perspective elevation of an improved indicating instrument which is interposed in the circuit to the motor, which drives the agitator.

Fig. 2 is a diagrammatic view of an electrically driven ice cream freezing system in which our instrument is incorporated. Figure 3 is a rear view of the instrument showing diagrammatically its connection to the motor and also to the source of current.

Referring now more particularly to the characters of reference on the drawings, we preferably make our indicating instrument of the type having a horizontally movable needle and a circular vertical-faced scale, such as is employed in standard ammeter construction. This instrument includes a casing (1) in which the operating mechanism is mounted, and has a horizontally extending and vertically-faced scale (2) of considerable radius and length. This scale has arbitrarily numbered and spaced graduations (3) projecting vertically on both sides of the centrally located and horizontal slot (4) through which the needle (5) of the instrument projects. The coil (6) of the instrument controls the movement of the needle in the usual manner.

16 is a variable resistance shunted across the coil (6) in such manner that by changing its resistance the current or energy necessary for full scale deflection of the indicator is changed. This allows the same instrument to be used on freezers of various sizes, allows for accurate adjustment of the sensitivity of the instrument and thereby makes unnecessary the winding of special sized coils for coil No. 6. Independently mounted in the casing (1) axially to the scale (2) and reading against the graduations (3) are upper and lower pointers (9) and (9ª). These pointers extend above and below the scale respectively and are connected to operating knobs (10) and (10ª) respectively, which project outwardly of the casing. By this means the pointers may be independently adjusted along the scale to meet different conditions of operation.

In operation, as the ice cream increases in stiffness with the freezing thereof, the needle moves toward the right hand end of the scale as the amperage drawn by the motor increases with the load placed thereon by the stiffening cream. When the whip point has been reached (which point is determined by a suitable test) the upper pointer (9) is moved to align with the position occupied by the needle at such time and the brine or freezing medium is turned off.

The resistance or load on the motor changes and the needle moves to a new position until it reaches a point when a test shows the cream is in a condition to be drawn from the freezer. The lower pointer (9ª) is then moved to align with the position occupied by the needle at such time. Thereafter, when freezing batches of ice cream of the same character, the pointers are left in the position to which they have been set as above, and give positive indications in connection with the needle, as to when the whip and draw points of the freezing operations of said batches have been reached.

The pointers are therefore important as they allow of easy adjustment to take care of different whip and draw points, and afford positive means for indicating said points in connection with the movement of the needle, without having to make permanent identification or indicating marks on the scale to take care of any and all different conditions, and which would be confusing or incorrect. Pointers are a necessary feature of the apparatus for they make possible practical working of the instrument because they allow for accurate and consistent reading.

A scale of considerable length must be used, so that the deflection of the needle along the scale will be great enough, with only slight variations in amperage, to enable close and accurate readings to be taken. This is essential, since the final condition of the ice cream depends absolutely on the closeness of such readings, in connection of course with the action of the operator in following the warning or instructions given him by the needle. In actual practice this principle is further carried out by suppressing on the instrument, the motor and empty freezer or mixer load.

The graduations on the scale are arbitrary as previously stated, and merely make it easy to initially set the pointers to the proper positions, and enable such positions to be easily read, so that they can be instantly reset without any question after having once been shifted.

We preferably employ a three phase motor, with the necessary three wire circuit from the main line wires (11). One wire (12) of this circuit leads from the main line to one terminal of the coil (6), while the other wire (13) from said coil leads to the motor.

To prevent possible straining or overloading of the coil (6) when starting the motor, we preferably provide a by-pass circuit (14) around the coil. This circuit may have an ordinary switch therein, indicated at (15) which is controlled by a knob (17) on the outside of the casing (1). This switch allows a part of the current to be shunted around the coil (6) at the start and thus protects the instrument from the heavy starting overload. This arrangement is also essential to the practical working of the instrument because without its use the constant stopping and starting of the freezer or mixer soon breaks the delicate parts.

Our instrument while preferably built on the principle of the ordinary ammeter could be constructed on the wattmeter principle and is made recording as well as indicating. It in no case registers amperes or watts as such.

The instrument is not limited to use with the freezing of ice cream, but may also be used in connection with pastry, candy, emulsions or salad oil making or any other place where a variation of the consistency of the product treated is accompanied by a correlated change in the load on the agitator motor.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

We are aware that prior to our invention ammeter type instruments were used for indicating the variation in the stage of a process. However we have found that without the combination of elements as set forth in these specifications, successful operation was impractical, due first to the impossibility of the operator to make close and consistent readings; second, lack of durability of instruments due to the failure to by-pass part of the starting load; third, the commerical impracticability of providing a specially wound coil for each type and size of freezer which objection is eliminated by the use of coil 16. It is evident that with our type of construction we have eliminated these objections in connection with our instrument.

We do not claim the method nor the use of the ammeter or wattmeter principle, but do claim and desire to secure by Letters Patent:

1. An apparatus for determining variations in the physical conditions of agitated materials including in combination a motor for agitating the material, a current measuring instrument in series with the motor, said current measuring instrument including a current actuated pointer, a scale over which said pointer moves, and a plurality of manually adjustable indicating pointers juxtaposed with relation to the current indicating pointer for automatically indicating certain operations to be performed upon the agitated material, said current indicating instrument adapted to carry a substantially full load of current for the motor except at the moment of starting.

2. An apparatus for determining variations in the physical conditions of agitated materials including in combination a motor for agitating the material, a current measuring instrument in series with the motor, said current measuring instrument including a current actuated pointer, a scale over which said pointer moves, and a plurality of manually adjustable indicating pointers juxtaposed with relation to the current indicating pointer for automatically indicating certain operations to be performed upon the agitated material, said current indicating instrument adapted to carry a full current for the motor except at the moment of starting.

3. An apparatus for determining variations in the physical conditions of agitated materials including in combination a motor for agitating the material, a current measuring instrument in series with the motor, said current measuring instrument including a current actuated pointer, a scale over which said pointer moves, and a plurality of manually adjustable indicating pointers juxtaposed with relation to the current indicating pointer for automatically indicating certain operations to be performed upon the agitated material, said current indicating instrument including a resistance and means for varying said resistance to correspond with various motors used in the apparatus.

4. An apparatus for determining variations in the physical conditions of agitated materials including in combination a motor for agitating the material, a current measuring instrument in series with the motor, said current measuring instrument including a current actuated pointer, a scale over which said pointer moves, and a plurality of manually adjustable indicating pointers juxtaposed with relation to the current indicating pointer for automatically indicating certain operations to be performed upon the agitated material, said current indicating instrument adapted to carry a substantially full load of current for the motor except at the moment of starting, said adaptation comprising a switch in parallel with the coil of the indicating instrument.

5. An apparatus for determining variations in the physical conditions of agitated materials including in combination a motor for agitating the material, a current measuring instrument in series with the motor, said current measuring instrument including a current actuated pointer, a scale over which said pointer moves, and a plurality of manually adjustable indicating pointers juxtaposed with relation to the current indicating pointer for automatically indicating certain operations to be performed upon the agitated material, said current indicating instrument adapted to carry a substantially full load of current for the motor except at the moment of starting, said adaptation comprising a switch in parallel with the coil of the indicating instrument, and a further switch in the main current line for controlling all of the supply of current to both the motor and the current consumption indicator.

6. An apparatus for determining variations in the physical conditions of agitated materials including in combination a motor for agitating the material, a current measuring instrument in series with the motor, said current measuring instrument including a current actuated pointer, a scale over which said pointer moves, and a plurality of manually adjustable indicating pointers juxtaposed with relation to the current indicating pointer for automatically indicating certain operations to be performed upon the agitated material, said current indicating instrument adapted to carry a substantially full load of current for the motor except at the moment of starting, said adaptation comprising a switch in parallel with the coil of the indicating instrument, a variable resistance in the current indicator, the switch, the variable resistance, and the coil of the current consumption indicator being all in parallel connection with each other.

7. An apparatus for determining variations in the physical conditions of agitated materials including in combination a motor for agitating the material, a current measuring instrument in series with the motor, said current measuring instrument including a current actuated pointer, a scale over which said pointer moves, and a plurality of manually adjustable indicating pointers juxtaposed with relation to the current indicating pointer for automatically indicating certain operations to be performed upon the agitated material, said current indicating instrument adapted to carry a substantially full load of current for the motor except at the moment of starting, said adaptation comprising a switch in parallel with the coil of the indicating instrument, a variable resistance in the current indicator, the switch, the variable resistance, and the coil of the current consumption indicator being all in parallel connection with each other, and in series with the main line and the motor.

ARTHUR W. FARRALL.
GROVER D. TURNBOW.